(12) United States Patent
Griffiths et al.

(10) Patent No.: US 10,948,005 B2
(45) Date of Patent: Mar. 16, 2021

(54) BOLT COMPRESSION LIMITER

(71) Applicant: GM Global Technology Operations LLC, Detroit, MI (US)

(72) Inventors: Leonard Griffiths, Fenton, MI (US); Shawn M. Owen, Ortonville, MI (US); David A. Wulbrecht, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 204 days.

(21) Appl. No.: 16/016,983

(22) Filed: Jun. 25, 2018

(65) Prior Publication Data
US 2019/0390702 A1    Dec. 26, 2019

(51) Int. Cl.
*F16B 39/26*    (2006.01)
*F16B 41/00*    (2006.01)
*F16B 43/00*    (2006.01)

(52) U.S. Cl.
CPC ............ *F16B 39/26* (2013.01); *F16B 41/002* (2013.01); *F16B 43/009* (2013.01)

(58) Field of Classification Search
CPC .......... F16B 39/10; F16B 39/14; F16B 39/24; F16B 39/26; F16B 39/34; F16B 39/36; F16B 41/002; F16B 43/00; F16B 43/009
USPC ..... 411/368, 370, 371.2, 383, 384, 544, 943
See application file for complete search history.

(56) References Cited

U.S. PATENT DOCUMENTS

| | | | | |
|---|---|---|---|---|
| 1,945,005 A | * | 1/1934 | Vacher | F16B 39/26 411/134 |
| 2,563,976 A | * | 8/1951 | Torosian | F16B 33/002 411/544 |
| 2,631,633 A | * | 3/1953 | Peckham | F16B 39/26 411/134 |
| 2,706,656 A | * | 4/1955 | Roubal | F16B 43/001 411/301 |
| 2,713,482 A | * | 7/1955 | Stapleton | F16B 43/00 267/162 |
| 3,116,816 A | * | 1/1964 | Johnson | F16B 5/0216 403/281 |
| 3,209,805 A | * | 10/1965 | Fehrmann | F16B 37/02 411/247 |
| 3,321,221 A | * | 5/1967 | Harris | F16B 21/10 403/241 |
| 3,585,894 A | * | 6/1971 | Brown | F16B 5/02 411/387.4 |
| 3,971,086 A | * | 7/1976 | Stanaitis | B23P 13/00 470/4 |
| 4,135,694 A | * | 1/1979 | Stegenga | B60R 1/076 248/478 |
| 4,435,112 A | * | 3/1984 | Becker | F16B 5/02 29/453 |
| 4,690,365 A | * | 9/1987 | Miller | F16B 5/0233 248/188.4 |
| 5,577,854 A | * | 11/1996 | Jacob | B60G 7/00 280/93.508 |

(Continued)

*Primary Examiner* — Roberta S Delisle

(57) ABSTRACT

A bolt compression limiter includes a Belleville disc that applies a load to a flange of a bolt assembly and a component that applies a load to a limiter positioned within the flange, the limiter being shy of the top surface of the flange. The load applied to the flange is a first proportion and the load applied to the limiter is a second proportion of the total load applied when a bolt of the bolt assembly is tightened.

18 Claims, 3 Drawing Sheets

(56) References Cited

U.S. PATENT DOCUMENTS

| | | | | |
|---|---|---|---|---|
| 7,708,512 | B2* | 5/2010 | McLean | F16B 41/002 |
| | | | | 411/533 |
| 7,854,425 | B2* | 12/2010 | Evans | F16F 3/02 |
| | | | | 267/162 |
| 8,454,290 | B2* | 6/2013 | Schaser | F16B 5/0258 |
| | | | | 411/544 |
| 9,929,482 | B2* | 3/2018 | Van Ceulen | H01R 9/16 |
| 2005/0095085 | A1* | 5/2005 | Winker | F16B 39/26 |
| | | | | 411/533 |
| 2005/0220564 | A1* | 10/2005 | Hinson | F16B 43/00 |
| | | | | 411/353 |
| 2007/0098524 | A1* | 5/2007 | Dunlap | F16B 39/26 |
| | | | | 411/533 |
| 2013/0287520 | A1* | 10/2013 | Hartzler | F16B 5/0241 |
| | | | | 411/347 |

* cited by examiner

BOLT COMPRESSION LIMITER

The present disclosure relates to a bolt compression limiter. More specifically, the present disclosure relates to a dual spring bolt compression limiter.

In various bolt assemblies, two components are joined together with a bolt. One component, for example, can be a flange. In some arrangements, a limiter is placed within the flange to provide structural support to the flange. If the top of the limiter is shy of the top surface of the flange, the bolt head crushes the flange onto the top of the limiter to stabilize the bolt assembly by preventing the loosening of the bolt.

Accordingly, while current bolt assemblies achieve their intended purpose, there is a need for a new and improved assembly that minimizes or prevents damage to the flange.

SUMMARY

According to several aspects, a bolt compression limiter includes a Belleville disc that applies a load to a flange of a bolt assembly and a component that applies a load to a limiter positioned within the flange, the limiter being shy of the top surface of the flange. The load applied to the flange is a first proportion and the load applied to the limiter is a second proportion of the total load applied when a bolt of the bolt assembly is tightened.

In an additional aspect of the present disclosure, the component is a second Belleville disc.

In another aspect of the present disclosure, the load applied to the limiter is from about 25% to about 75% of the total load applied to the limiter and the flange.

In another aspect of the present disclosure, the flange is made of a metallic material.

In another aspect of the present disclosure, the flange is made of a composite material.

In another aspect of the present disclosure, the limiter is press fit into the flange or held in place by a retention feature.

In another aspect of the present disclosure, the component is a plurality of tangs.

In another aspect of the present disclosure, each tang has a rectangular shape.

In another aspect of the present disclosure, each tang has a first curved base, a second curved base that is smaller than the first curved base, and two straight sides.

In another aspect of the present disclosure, the component is a helical spring.

According to several aspects, a bolt compression limiter includes a Belleville disc that applies a load to a flange of a bolt assembly and a biasing mechanism that applies a load to a limiter positioned within the flange. The load applied to the flange is a first proportion and the load applied to the limiter is a second proportion of the total load applied when the bolt is tightened.

In another aspect of the present disclosure, the biasing mechanism is a second Belleville disc.

In another aspect of the present disclosure, the load applied to the limiter is from about 25% to about 75% of the total load applied to the limiter and the flange.

In another aspect of the present disclosure, the limiter is press fit into the flange.

In another aspect of the present disclosure, the biasing mechanism is a plurality of tangs.

In another aspect of the present disclosure, each tang has a rectangular shape.

In another aspect of the present disclosure, each tang has a first curved base, a second curved base that is smaller than the first curved base, and two straight sides.

In another aspect of the present disclosure, the component is a helical spring.

According to several aspects, a bolt assembly includes a bolt that applies a total load to the bolt assembly, a Belleville disc that applies a first proportion of the total load to a flange of the bolt assembly, and a limiter positioned within the flange, a second proportion of the total load being applied to the limiter.

In another aspect of the present disclosure, the load applied to the flange is from about 25% to about 75% of the total load applied by the bolt to the assembly.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
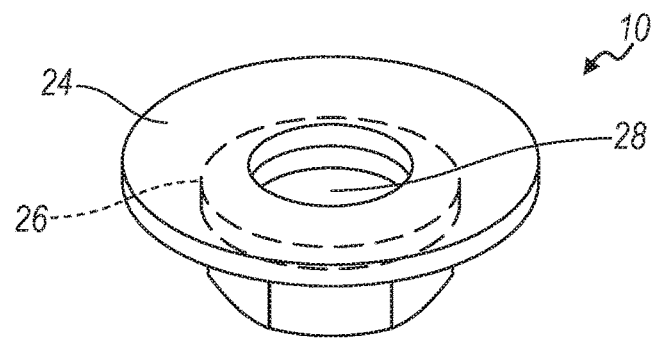
FIG. 1 is a perspective view of a bolt compression limiter in accordance with the principles of the present disclosure.

Referring to FIG. 1, there is shown a bolt compression limiter 10 in accordance with the principles of the present disclosure. The bolt compression limiter 10 includes a first Bellville disc 24 and a second Belleville disc 26. The second Belleville disc 26 has a smaller diameter than the first Belleville disc 24 and is positioned beneath the first Bellville disc 24. The first Belleville disc 24 and the second Bellville disc 26 define an opening 28.

Figure 2A:
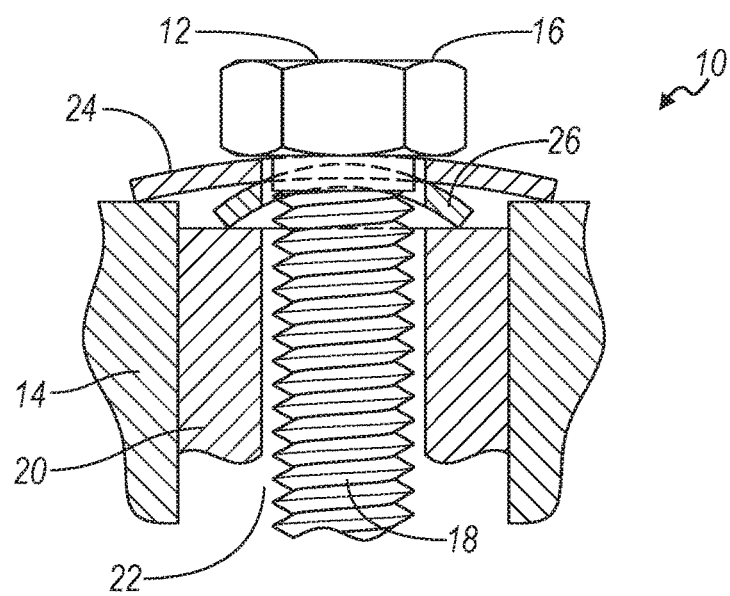
FIG. 2A is a side cross-sectional view of the bolt compression limiter shown in FIG. 1 prior to loading of a bolt assembly.

Referring further to FIG. 2A, there is shown a bolt assembly with a bolt 12 that includes a bolt head 16 and a threaded portion 18 that passes through the opening 28 of the bolt compression limiter 10. The bolt assembly further includes a limiter 20 positioned within a flange 14. The limiter 20 is press fit into the flange 14 to provide structural support to the flange 14. Alternatively, the limiter 20 is loosely held in the flange 14 and held in place by a retention feature. The limiter 20 is generally made of a metallic material while the flange 14 is made of a metallic material or a composite material.

The limiter 20 is generally cylindrical in shape with an opening 22 and is positioned shy of the top surface of the flange 14, that is, the top of the limiter 20 is positioned below the top surface of the flange 14 as clearly indicated in FIG. 2A. The threaded portion 18 of the bolt 12 passes through the opening 22 and is threaded into another component to join the bolt assembly to the component.

Figure 2B:
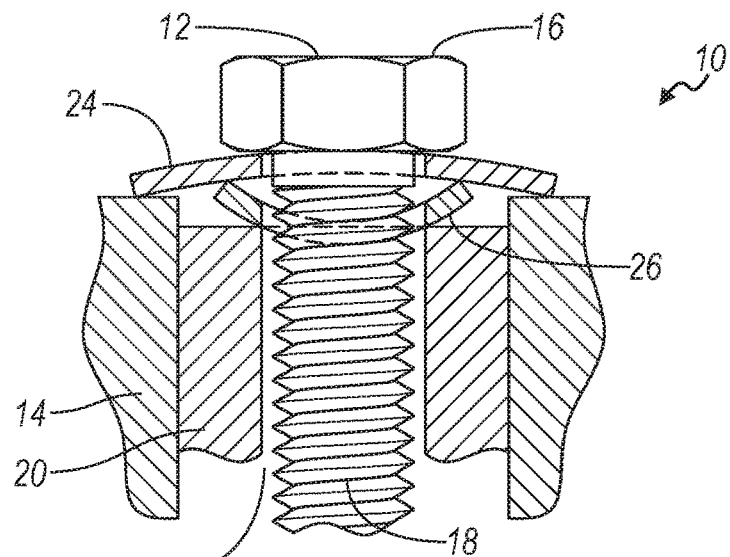
FIG. 2B is a side cross-sectional view of the bolt compression limiter shown in FIG. 1 after loading of the bolt assembly.

Prior to loading of the bolt 12 (FIG. 2A), tightening the bolt 12 into the other component, the outer edge of the first Belleville disc 24 resides on top of the flange 14 while the outer edge of the second Belleville disc 26 resides on top of the limiter 20. As the bolt is threaded into the other component, the bolt head 16 applies a load to the first Belleville disc 24. Since the second Belleville disc 26 is positioned between the first Belleville disc 24 and the limiter 20, some of the load applied to the first Belleville disc 24 is transmitted to the second Belleville disc 26, which in turn transmits the partial load to the limiter 20. In another arrangement shown in FIG. 2B, the inner portion of the second Belleville disc 26 makes contact with the limiter 20 such that the outer edge of the first Belleville disc 24 applies a load to the flange 14, and the inner portion of the second Belleville disc applies a partial load to the limiter 20. In certain arrangements, as the bolt 12 is further tightened into the other component, the edge of the second Belleville disc 26 (shown in FIG. 2A) snaps upward to make contact with the first Belleville disc 24 while the inner portion of the second Belleville disc 26 makes contact with the limiter 20, as shown in FIG. 2B. Hence, the outer edge of the first Belleville disc 24 applies a load to the flange 14, and the inner portion of the second Belleville disc 26 applies a partial load to the limiter 20.

Without the two spring arrangement shown in FIGS. 2A and 2B, the bolt 12 has to crush the flange 14 to put a load on the limiter 20 to stabilize the bolt assembly such that the bolt 12 is prevented from loosening from the bolt assembly. The two spring arrangement of the first Belleville disc 24 and second Belleville disc 26 shown in FIG. 2B, however, applies a load to both the flange 14 and the limiter 20 without applying an excess load to the flange 14 that would crush the flange 14 onto the limiter 20. The load applied to the limiter 20 is greater than the load applied to the flange 14 in some arrangements, while in other arrangements, the load applied to the limiter 20 is less than the load applied to the flange 14. For example, in various arrangements, the load applied to the limiter 20 is about 75% of the total load applied to the bolt assembly with the bolt 12, while in other arrangements the load applied to the limiter 20 is about 25% of the total load applied to the bolt assembly. As such, damage to the flange 14 is minimized or eliminated, especially to flanges made of composite materials.

Figure 3A:
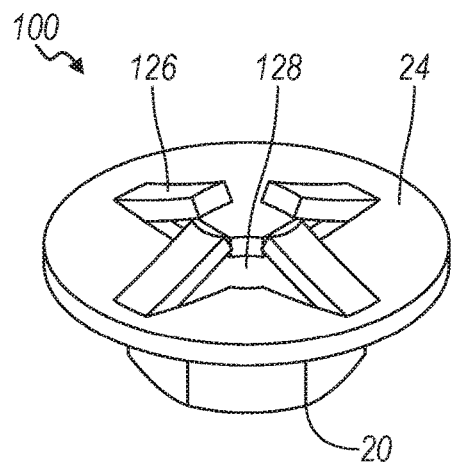
FIG. 3A is a perspective view of an alternative bolt compression limiter in accordance with the principles of the present disclosure.
Figure 3B:
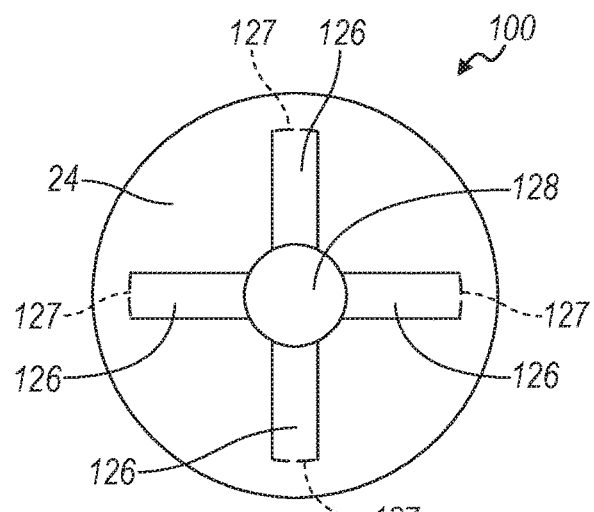
FIG. 3B is a top view of the bolt compression limiter shown in FIG. 3A.

Referring now to FIGS. 3A and 3B, there is shown another bolt compression limiter 100 in accordance with the principles of the present disclosure. It should be noted that the bolt compression limiter 100, as well as other bolt compression limiters described below, is utilized in conjunction with the bolt assembly including the previously described bolt 12, the flange 14 and the limiter 20. Rather than the second Belleville disc 26 of the bolt compression 10, the bolt compression limiter 100 includes a set of rectangular tangs 126. Each tang 126 has a base 127 attached to the first Belleville disc 24. Prior to loading the bolt assembly with the bolt 12, the inner portions of the tangs 126 are preloaded in an upward position. When the bolt 12 is positioned into the opening 28 and tightened into the other component, an initial load is applied to the inner portions of the tangs 126 until they snap downwards onto the limiter 20. In other arrangements, the tangs 126 are initially angled downwards onto the limiter 20 without snapping into the downward position. Accordingly, in any of these arrangements, the head of the bolt 12 applies a load to the first Belleville disc 24, which in turn applies a load to the flange 14. The load applied to the limiter 20 is greater than the load applied to the flange 14 in some arrangements, while in other arrangements, the load applied to the limiter 20 is less than the load applied to the flange 14. For example, in some arrangements, the tangs 126 apply a load of about 75% of the total load to the limiter 20. In other arrangements, the tangs 126 apply a load of about 25% to the limiter 20.

Figure 4:
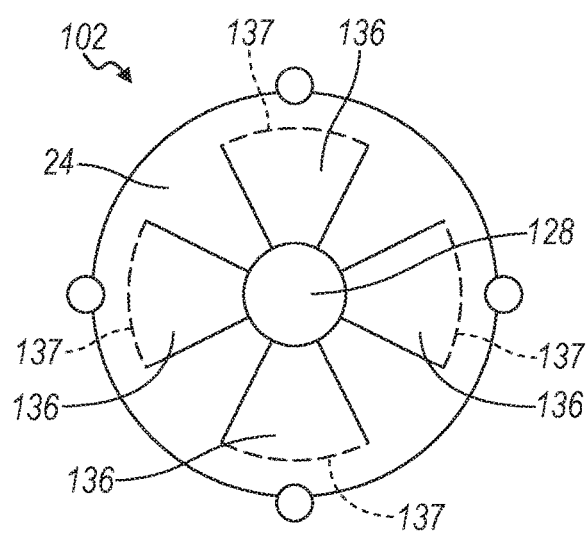
FIG. 4 is a top view of another alternative bolt compression limiter in accordance with the principles of the present disclosure.

The tangs need not be rectangular in shape. For example, as shown in FIG. 4 a bolt compression limiter 102 includes a set of tangs 136 with a first curved base 137 attached to the first Belleville disc 24, a second curved base that is smaller than the first curved base which together with the first Belleville dis 24 define the opening 28, and two straight sides that connect the two curved bases. Prior to loading the bolt assembly with the bolt 12, the inner portions of the tangs 136 are preloaded in an upward position. When the bolt 12 is positioned into the opening 28 and tightened into the bolt assembly, an initial load is applied to the inner portions of the tangs 136 until they snap downwards onto the limiter 20. In other arrangements, the tangs 136 are initially angled downwards onto the limiter 20 without snapping into the downward position. Accordingly, in any of these arrangements, the head of the bolt 12 applies a load to the first Belleville disc 24, which in turn applies a load to the flange 14. The load applied to the limiter 20 is greater than the load applied to the flange 14 in some arrangements, while in other arrangements, the load applied to the limiter 20 is less than the load applied to the flange 14. For example, in some arrangements, the tangs 136 apply a load of about 75% of the total load to the limiter 20, while in other arrangements the tangs 136 apply a load of about 25% to the limiter 20.

Figure 5:
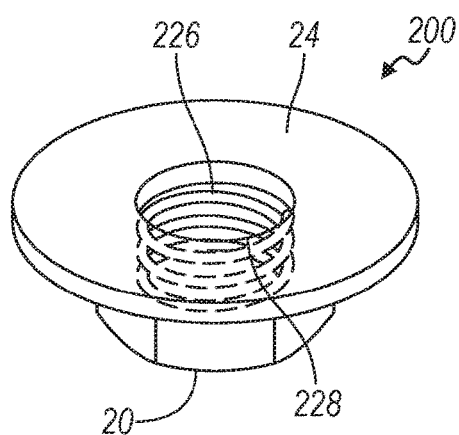
FIG. 5 is a perspective view of yet another alternative bolt compression limiter in accordance with the principles of the present disclosure.

Turning now to FIG. 5, there is shown another bolt compression limiter 200 in accordance with the principles of the present disclosure. The bolt compression limiter 200 includes a helical spring 226 positioned beneath the first Belleville disc 24. When the bolt 12 is positioned into the opening 28 and tightened into the bolt assembly, a load is applied to the first Belleville disc 24 which applies a load to the flange 14. Since the helical spring 226 is positioned between the first Belleville disc 24 and the limiter 20, a portion of the load applied to the first Belleville disc 24 is transmitted to the helical spring 226 which in turn applies a load of about 75% of the total load to the limiter 20, while in other arrangements the helical spring 226 applies a load of about 25% to the limiter 20. Accordingly, the load applied to the limiter 20 is greater than the load applied to the flange 14 in some arrangements, while in other arrangements, the load applied to the limiter 20 is less than the load applied to the flange 14.

Figure 6A:
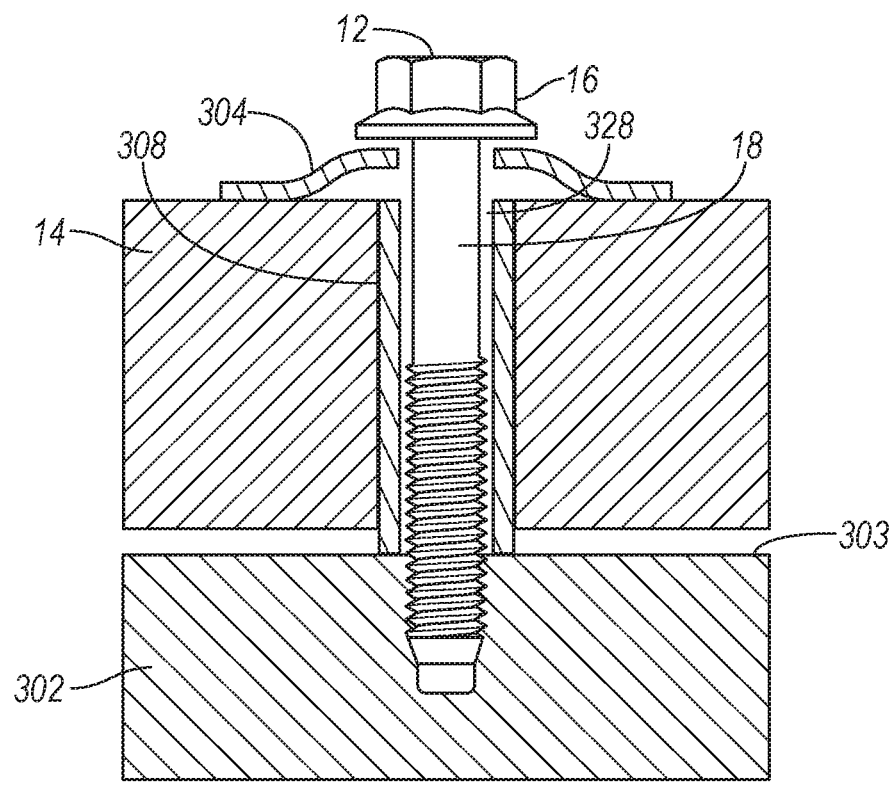
FIGS. 6A and 6B are cross-sectional views of yet another alternative bolt compression limiter in accordance with the principles of the present disclosure.
Figure 6B:
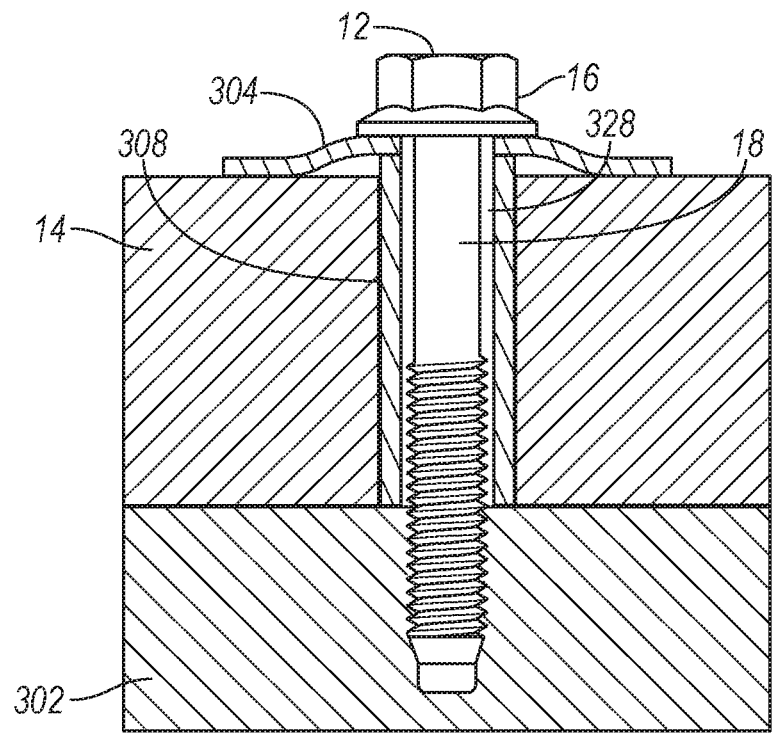

Referring to FIGS. 6A and 6B, there is shown another bolt compression limiter 300 in accordance with the principles of the present disclosure. The bolt compression limiter 300 includes a Belleville disc 304 that resides on top of the flange 14 and a limiter 308 that is positioned within the flange 14. As shown in FIG. 6A, the top of the limiter 308 is level with the top surface of the flange 14. In other arrangements, the top of the limiter 308 is proud of the top surface of the flange 14 or is shy of the top surface of the flange 14. The bolt 12 extends through an opening 328 of defined by the Belleville disc 304 and the limiter 308 is threaded into a component 302. As the bolt 12 is tightened (FIG. 6B), the flange 14 and the component 302 are joined together such that the Belleville disc applies a first proportion of a total load to the flange 14 while a second proportion of the total load is applied to the limiter 308. The load applied to the surface 308 is greater than the load applied to the flange 14 in some arrangements, while in other arrangements, the load applied to the surface 308 is less than the load applied to the flange 14. For example in some arrangements, the load applied to the flange 14 is about 25% of the total load, while in other arrangements the load applied to the flange 14 is about 75% of the total load. As such, damage to the flange 14 is minimized or eliminated, especially to flanges made of composite materials.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A bolt compression limiter comprising:
a Belleville disc that applies a load to the top of a flange of a bolt assembly; and
a component that applies a load to a limiter, the limiter being cylindrical in shape with an opening, positioned within the flange, the limiter being shy of the top surface of the flange,
wherein the load applied to the flange is a first proportion and the load applied to the limiter is a second proportion of the total load applied when a bolt of the bolt assembly is tightened.

2. The bolt compression limiter of claim 1 wherein the component is a second Belleville disc.

3. The bolt compression limiter of claim 1 wherein the load applied to the limiter is from about 25% to about 75% of the total load applied to the limiter and the flange.

4. The bolt compression limiter of claim 1 wherein the flange is made of a metallic material.

5. The bolt compression limiter of claim 1 wherein the flange is made of a composite material.

6. The bolt compression limiter of claim 1 wherein the limiter is press fit into the flange or held in place by a retention feature.

7. The bolt compression limiter of claim 1 wherein the component is a plurality of tangs.

8. The bolt compression limiter of claim 7 wherein each tang has a rectangular shape.

9. The bolt compression limiter of claim 7 wherein each tang has a first curved base, a second curved base that is smaller than the first curved base, and two straight sides.

10. The bolt compression limiter of claim 1 wherein the component is a helical spring.

11. A bolt compression limiter comprising:
a Belleville disc that applies a load to a flange of a bolt assembly, the Belleville disc residing on top of the flange: and
a biasing mechanism that applies a load to a limiter, the limiter being cylindrical in shape with an opening, positioned within the flange and shy of the top surface of the flange, the biasing mechanism positioned between the Belleville disc and the limiter, the biasing mechanism residing on top of the limiter, the load applied to the flange being a first proportion and the load applied to the limiter being a second proportion of the total load applied when a bolt of the bolt assembly is tightened.

12. The bolt compression limiter of claim 11 wherein the biasing mechanism is a second Belleville disc.

13. The bolt compression limiter of claim 11 wherein the load applied to the limiter is from about 25% to about 75% of the total load applied to the limiter and the flange.

14. The bolt compression limiter of claim 11 wherein the limiter is press fit into the flange.

15. The bolt compression limiter of claim 11 wherein the biasing mechanism is a plurality of tangs.

16. The bolt compression limiter of claim 15 wherein each tang has a rectangular shape.

17. The bolt compression limiter of claim 16 wherein each tang has a first curved base, a second curved base that is smaller than the first curved base, and two straight sides.

18. The bolt compression limiter of claim 11 wherein the component is a helical spring.

* * * * *